United States Patent
Zeltyn et al.

(10) Patent No.: US 11,928,010 B2
(45) Date of Patent: Mar. 12, 2024

(54) EXTRACTING AND SELECTING FEATURE VALUES FROM CONVERSATION LOGS OF DIALOGUE SYSTEMS USING PREDICTIVE MACHINE LEARNING MODELS

(71) Applicant: International Business Machines Corporation, Armonk, NY (US)

(72) Inventors: Sergey Zeltyn, Haifa (IL); Avi Yaeli, Ramot Menashe (IL)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 17/490,267

(22) Filed: Sep. 30, 2021

(65) Prior Publication Data

US 2023/0097628 A1    Mar. 30, 2023

(51) Int. Cl.
| | |
|---|---|
| *G06F 11/07* | (2006.01) |
| *G06F 18/2113* | (2023.01) |
| *G06F 18/2115* | (2023.01) |
| *G06F 18/214* | (2023.01) |
| *G06N 20/00* | (2019.01) |

(52) U.S. Cl.
CPC ........ *G06F 11/079* (2013.01); *G06F 18/2113* (2023.01); *G06F 18/2115* (2023.01); *G06F 18/214* (2023.01); *G06N 20/00* (2019.01)

(58) Field of Classification Search
CPC ............... G06F 11/079; G06F 18/2113; G06F 18/2115; G06F 18/214; G06F 18/24323; G06N 20/00; G06N 5/01; G06N 20/02

USPC ......................................................... 714/37
See application file for complete search history.

(56) References Cited

U.S. PATENT DOCUMENTS

| | | | |
|---|---|---|---|
| 8,656,219 B2 | 2/2014 | Suit | |
| 9,495,331 B2 | 11/2016 | Govrin et al. | |
| 2020/0005117 A1* | 1/2020 | Yuan | ..................... G06F 40/35 |
| 2021/0097978 A1* | 4/2021 | Mei | ..................... G10L 15/183 |

OTHER PUBLICATIONS

Andrist et al., "What Went Wrong and Why? Diagnosing Situated Interaction Failures in the Wild", International Conference on Social Robotics, Oct. 2017, 11 pages.
Lendvai et al., "Multi-feature Error Detection in Spoken Dialogue Systems", Computational Linguistics and AI, Tilburg University / Antwerp University, Jan. 2001, 17 pages.
Meena et al., "Automatic Detection of Miscommunication in Spoken Dialogue Systems", KTH Royal Institute of Technology School of Computer Science and Communication, Stockholm, Sweden, Sep. 2015, 11 pages.

(Continued)

*Primary Examiner* — Yair Leibovich
(74) *Attorney, Agent, or Firm* — Gilbert Harmon, Jr.

(57) ABSTRACT

An example system includes a processor that can receive conversation logs of a dialogue system to be analyzed. The processor can train a predictive machine learning model using a training set of the conversation logs on a selected feature to obtain feature values with associated importance values. The processor can select a number of feature values using a significance score calculated based on the associated importance values. The processor can generate an interactive user interface including the selected number of feature values.

20 Claims, 10 Drawing Sheets

(56) References Cited

OTHER PUBLICATIONS

Mell et al., "The NIST Definition of Cloud Computing", National Institute of Standards and Technology, U.S. Department of Commerce, Special Publication 800-145, 7 pages.
Ward et al., "Root causes of lost time and user stress in a simple dialog system", ResearchGate, Jan. 2005, 5 pages.
Wu et al., "Miscommunication handling in spoken dialog systems based on error-aware dialog state detection", EURASIP Journal on Audio, Speech, and Music Processing, 2017, 18 pages.
"Intelligent Virtual Assistant Market Insights—2027", Allied Market Research, downloaded from the Internet Dec. 21, 2023, 8 pages, <https://www.alliedmarketresearch.com/intelligent-virtual-assistant-market>.
"QPR Software", Wikipedia, Retrieved from "https://en.wikipedia.org/w/index.php?title=QPR_Software&oldid=1183775007", Dec. 22, 2023, 2 pages.
Georgiladakis et al., Root Cause Analysis of Miscommunication Hotspots in Spoken Dialogue Systems. In Interspeech 2016, 5 pages.
Kvale et al., "Improving Conversations: Lessons Learnt from Manual Analysis of Chatbot Dialogues", © Springer Nature Switzerland AG 2020, Conversations 2019, LNCS 11970, pp. 187-200, 2020, https://doi.org/10.1007/978-3-030-39540-7_13.
Lehto, Teemu, "Find Root Causes for Conformance Deviations with QPR ProcessAnalyzer", Dec. 28, 2018, 14 pages, <https://www.qpr.com/blog/find-root-causes-conformance-deviations-qpr-processanalyzer-2019.1>.
Qafari et al., "Root cause analysis in process mining using structural equation models", In International Conference on Business Process Management, BPM 2020, Conference paper, Abstract Only, 8 pages.
Sani et al., "Subgroup discovery in process mining", In International Conference on Business Information Systems, 2017, Jun. 15 pages.
Suriadi et al., "Root Cause Analysis with Enriched Process Logs", Business Process Management Work-shops: BPM 2012 International Workshops Revised Papers [Lecture Notes in Business Information Processing, vol. 132], Springer, Germany, pp. 174-186, https://doi.org/10.1007/978-3-642-36285-9_18.
Walker et al., "Learning to predict problematic situations in a spoken dialogue system: experiments with how may I help you?", NAACL 2000: Proceedings of the 1st North American chapter of the Association for Computational Linguistics conference, Apr. 2000, pp. 210-217.

\* cited by examiner

EXTRACTING AND SELECTING FEATURE VALUES FROM CONVERSATION LOGS OF DIALOGUE SYSTEMS USING PREDICTIVE MACHINE LEARNING MODELS

BACKGROUND

The present techniques relate to dialogue systems. More specifically, the techniques relate to dialogue system analysis.

SUMMARY

According to an embodiment described herein, a system can include processor to receive conversation logs of a dialogue system to be analyzed. The processor can also further train a predictive machine learning model using a training set of the conversation logs on a selected feature to obtain feature values with associated importance values. The processor can also select a number of the feature values using a significance score calculated based on the associated importance values. The processor can generate an interactive user interface including the selected number of feature values.

According to another embodiment described herein, a method can include receiving, via a processor, a number of conversation logs, a feature and an interaction type to be analyzed. The method can further include training, via the processor, a predictive machine learning model on a subset of the number of conversation logs to obtain feature values with associated importance values for the feature. Each of the predictive machine learning models are trained with respect to a different feature to be analyzed. The method can also further include selecting, via the processor, a number of feature values using a significance score calculated based on the associated importance values. The method can also include generating, via the processor, an interactive user interface including the selected number of feature values.

According to another embodiment described herein, a computer program product for generating interactive user interfaces can include computer-readable storage medium having program code embodied therewith. The computer readable storage medium is not a transitory signal per se. The program code executable by a processor to cause the processor to receive conversation logs, a selected feature, and an interaction type, to be analyzed. The program code can also cause the processor to train a predictive machine learning model on a subset of the number of conversation logs for the selected feature to obtain feature values with associated importance values. The program code can also cause the processor to select a number of the feature values using a significance score calculated based on the associated importance values. The program code can also cause the processor to generate an interactive user interface including the selected number of feature values.

DETAILED DESCRIPTION

Dialogue systems may be designed to automate a set of customer service tasks. However, these tasks can sometimes fail for a variety of reasons. For example, failure types and indicators may include user abandonment without task completion, escalation to human agent that is not by design, negative user feedback, negative sentiment in user input, or delayed escalation in which users connect to a human agent on a similar topic at a later point in time.

Some methods may detect failed conversations and tasks automatically. For example, failed conversations can be automatically identified via rule-based approaches. However, detecting features and specific feature values that cause these detected failures or are related to these detected failures may be challenging for analysis and demand a lot of manual effort.

According to embodiments of the present disclosure, a system includes a processor that can receive conversation logs of a dialogue system to be analyzed. The processor can train a predictive machine learning model using a training set of the conversation logs on a selected feature to obtain feature values with associated importance values. The processor can select a number of feature values using a significance score calculated based on the associated importance values. The processor can generate an interactive user interface including the selected number of feature values. Thus, embodiments of the present disclosure allow various issues in dialogue systems to be addressed using a root cause analysis. In various examples, the embodiments described herein can enable discovery of significant data features in escalated conversations and topic areas associated with the data features. For example, issues addressed may include missing intents and entities, training of existing intents, responding to previously mentioned entities in a single conversation, user struggle at dialog nodes, and errors in dialog logic. The embodiments described herein also enable integration with conversation transcripts and other analytics methods for root causes assessment and validation. The embodiments described herein also provide a convenient and intuitive user interface for conversation analysis.

Figure 1:
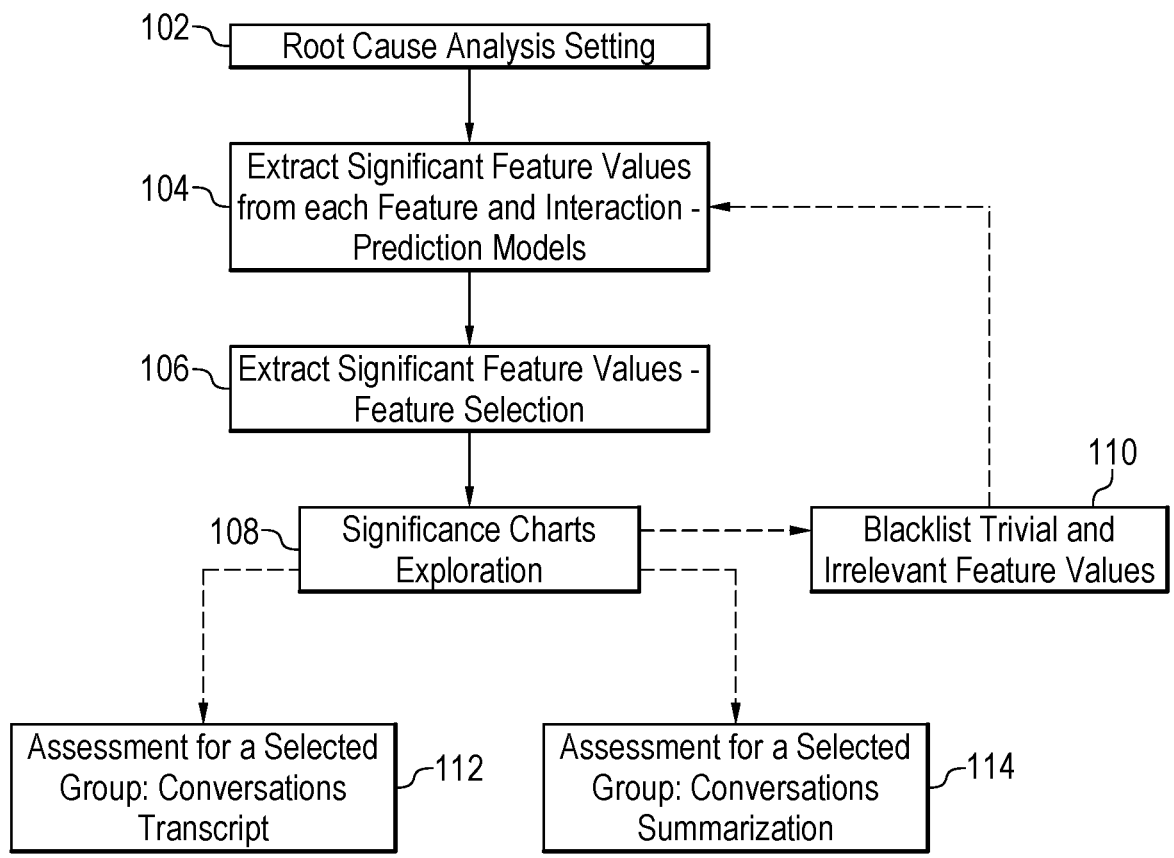
FIG. 1 is a process flow diagram of an example process for extracting and interactively displaying selected feature values of dialogue systems.

With reference now to FIG. 1, a process flow diagram shows an example process for extracting and interactively displaying selected feature values causing dialogue system failures. The example process 100 can be implemented with any suitable computing device, such as the computing device 300 of FIG. 3. For example, the method described below can be implemented by the processor 702 or the processor 1002 of FIGS. 7 and 10.

At block 102, a root cause analysis setting is initialized. For example, the root cause analysis setting may be received via a user interface or automatically initialized based on a default setting. In various examples, a failure type, explored features, interaction and filtering settings may be selected. In some examples, the features to be explored may be automatically set. In various examples, selection of an initial feature pool may be based on domain knowledge in conversation analytics. Therefore, in various examples, an expert with such domain knowledge may provide an initial set of features to be analyzed. An example user interface for receiving root cause analysis settings is described in greater detail with respect to FIG. 2.

At block 104, a prediction model is executed for extraction of significant feature values. For example, a random forest classifier model may be used as a prediction model. Random forest classifier is an ensemble learner based on randomized decision trees that provides feature importance measures as a by-product of training. In various examples, any other suitable machine learning prediction model that outputs importance of features may be used. For example, importance may be measured using importance coefficients. In some examples, Gini importance may be used as a default. For example, Gini importance measures feature relevance and is used to visualize implicit feature selection of random forest classifiers. In particular, Gini importance calculates each feature importance as the sum over the number of splits (across all tress) that include the feature, proportionally to the number of samples the feature splits. Alternatively, or in addition, permutation and Shapley importance can also be used.

The inputs into the prediction model may be conversations logs. Optionally, in some examples, the inputs may include a workspace. For example, the workspace may be a dialogue system representation in the form of any suitable software platform. In some examples, a number of features to be displayed can be configured by a user in the root cause analysis setting and may thus also be received as input.

The prediction model may receive as input a selected single feature or a specific interaction between multiple features. In various examples, a variety of feature types may be related to conversation failures and thus selected to be used in the prediction model. For example, the feature types may include text, user dimensions, dialogue system dimensions, dialogue system context, customer-defined context, conversation length, and interactions and temporal relations between two or more of any of these features. In some examples, a text feature type may include user inputs and dialogue system response. A user dimension feature type may include geographical location, educational level, age, among other user dimension feature types. A dialogue system dimension feature type may include the communication channel used. A dialogue system context feature type may include intents and confidences, entities, visited dialog nodes, context variables, conditions, and execution commands. A customer-defined context feature type may include conversation milestones. A conversation length feature type may include a number of turns and duration.

In various examples, interactions and temporal relations between features of any of the feature types described above may be input into the prediction model. In some examples, the order of events may be important. Thus, a user may specify in the root cause analysis setting that the order of events may be taken into account when analyzing importance. In some examples, an automatic default may also take into account the particular temporal order of events when analyzing various features and their interactions. Example interactions may include interactions between user input and country, between user input and dialog node name, between pairs of dialog nodes at consequential turns. As used herein, consequential turns are turns that follow one another. For example, a fourth turn may follow a third turn and thus be described as consequential turns.

In some examples, feature engineering may be performed for text features. For example, the feature engineering may include performing stop words cleaning and lemmatization. Lemmatization, as used herein, refers to bringing words into a standardized form based on an underlying lemma. The feature engineering may also include extraction of n-grams. For example, unigrams, bigrams, or trigrams may be extracted. In various examples, the extraction may be run separately for each selected n. For example, the extraction may be run twice if both unigrams and bigrams are to be extracted.

In some examples, a frequency filtering may be performed on the feature values prior to being run on the prediction model. For example, feature values that satisfy frequency threshold may be selected. In various examples, the threshold may depend on the feature type and cardinality of the feature. Thus, the feature space may be truncated by frequency and statistical significance before running prediction models. For example, statistical significance filtering may filter out features who do not pass a standard significance test on frequencies.

In various examples, a categorical feature space may be generated via machine learning based on feature values. In some examples, binning may be used for numerical features. In various examples, the data may be divided into a training and a testing set. For example, 80% of the data may be used for computing features values and the importance of feature values for each feature and 20% of the data may be reserved for the testing set used to determine accuracy of the model. In some examples, a K-Fold generalization can be applied with results averaging during training.

A prediction model that predicts success or failure of conversations based on input feature values for a particular feature or interaction may then be executed for each selected feature or interaction between features. For example, parameters of each prediction model may be computed on a training set of conversation logs. Accuracy of each prediction model may then computed on the testing set of conversation logs. In various examples, an output precision metric of each prediction model may be saved for later use in block 106. For example, the precision metric may be accuracy. For example, the precision may be the fraction of detections that the prediction model detected correctly, or the ratio between the true positives to the total number of detected positives.

For each feature and interaction between features, feature values may be ordered based on importance with respect to conversation failure. For example, the feature values may be ordered according to their importance with respect to predicting failure of conversation as determined by the respective prediction model. In addition, in various examples, the feature space may be truncated by frequency and statistical significance after running the prediction models. For example, one or more features or feature values may be excluded based on infrequency or statistical insignificance. As one examples, statistical insignificance may be determined based on Pearson's chi-squared test.

At block 106, important feature values from different features and interactions are extracted, merged, and ordered by significance. For example, the input into block 106 may be the top-n feature values of each prediction model. The most important features and feature values related to every type of failure in consideration may then be identified and ordered by importance. In some examples, the most important interactions may also be included and ordered by significance. For example, the final ordered list of important feature values may include a merged list of feature values corresponding to features and feature values corresponding to interactions between pairs of feature values.

In various examples, the input into block 106 for each selected feature and interaction i, may include: the n most important feature or interaction values and their corresponding importance coefficients, the accuracy of the corresponding prediction model, the feature type $T_i$, and the cardinality. For example, the importance coefficients $C_{ij}$ may be in the range: $1 \leq j \leq n$. The accuracy of a prediction model $a_i$ may be in the range $1 \leq a_i \leq 1$. In various examples, the feature type $T_i$ may be, for example, categorical, text—unigram, text—bigram, numerical, interaction between two categorical, interaction between categorical and text, etc. The cardinality $V_i$ may be the number of feature values. For example, a feature with many feature values may be more significant overall than a feature with few feature values.

In some examples, features and interactions associated with a prediction model having an accuracy $a_i$ less than a threshold may be filtered out. For example, the threshold may be set in advance or based on the particular feature being analyzed.

In various examples, a significance score may be calculated for each selected feature or interaction using a score function. For example, the score function may be based on the equation:

$$S_{ij} = C_{ij} \cdot F_1(\alpha_i) \cdot F_2(V_i) \cdot F_3(T_i) \qquad \text{Eq. 1}$$

where $F_1(\alpha_i)$ and $F_2(V_i)$ are non-decreasing. Example functions that could be used in Eq. 1 include:

$$F_1(\alpha_i) = 1/(1.05 - \alpha_i) \qquad \text{Eq. 2}$$

$$F_2(V_i) = V_i \qquad \text{Eq. 3}$$

$$F_3(T_i) = 4.0 \text{ (for interaction with bigram)}, 2.0 \text{ (for bigram or interaction)}, \text{ or } 1.0 \text{ (otherwise)} \qquad \text{Eq. 4}$$

In various examples, n feature or interaction values with maximum scores among $S_{ij}$, where $1 \leq j \leq n$.

At block 108, results of the analysis may be displayed to a user via a user interface. For example, the user interface may include significance charts. The significance charts may include ordered potential root causes and also present their frequency.

At block 110, a user can blacklist trivial or irrelevant feature values and rerun the algorithm without them. For example, a blacklist may be received and blocks 104-108 may be executed again.

At block 112, an assessment of transcripts for selected groups of conversations is executed. For example, one or more relevant portions of transcripts may be displayed for analysis. In various examples, a manual assessment of a focused group of failed conversations that contain a specific feature value or their combination may then be performed. For example, the manual assessment may be performed by a conversation analyst.

At block 114, conversation summarizations for selected groups of conversations are displayed. For example, an n-gram chart may be displayed. An example n-gram chart is described in greater detail with respect to FIG. 5.

The process flow diagram of FIG. 1 is not intended to indicate that the operations of the process 100 are to be executed in any particular order, or that all of the operations of the process 100 are to be included in every case. Additionally, the process 100 can include any suitable number of additional operations. For example, additional analytics for identified groups of conversations may be included to validate conclusions from the previous steps of the analysis.

Figure 2:
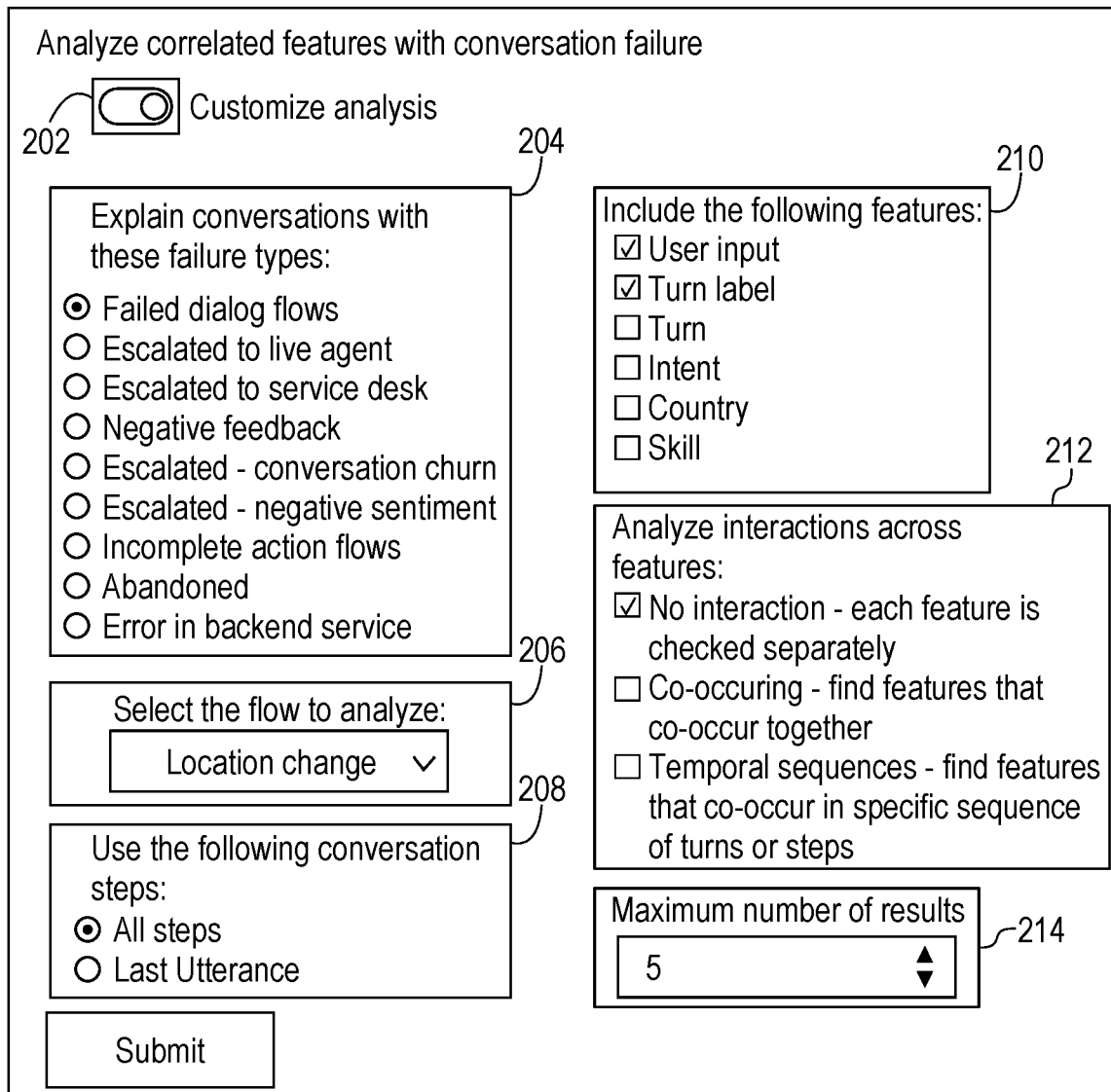
FIG. 2 is an example interactive user interface including a root cause analysis setting.

FIG. 2 is an example interactive user interface including a root cause analysis setting. The example interactive user interface 200 can be used by the process 100 of FIG. 1, or by the method 600 of FIG. 6. For example, the interactive user interface 200 can be generated by the processor 702 or the processor 1002 of FIGS. 7 and 10, respectively.

The interactive user interface 200 includes a toggle button 202 for enabling or disabling a manual feature selection mode that provides customization of analysis. In some examples, a completely automated operation of the root cause analysis may be enabled by disabling the customized analysis toggle button 202. For example, in an automatic operation setting, all features may be selected by default.

The interactive user interface 200 also includes a failure type selection setting 204. For example, the failure type selection setting enables users to select specific failure types for analysis. In various examples, the failure types may include failed dialog flows, escalations to live agents, escalations to service desks, negative feedback, escalated conversation churn, escalated negative sentiment, incomplete actions flows, abandoned conversations, or errors in backend services. In the example of FIG. 2, the failed dialog flow is selected. For example, the failed dialog flow may refer to a specific failed task. Task selection may thus be activated for failed dialog flows only in response to detecting that the failed dialog flows selection is set in the failure type selection setting 204.

The interactive user interface 200 includes a selection of task to analyze setting 206. For example, the selection of task to analyze may be a drop down menu providing a list of various different tasks for analysis. In the example of FIG. 2, the selected task is a location change. For example, the location change may be related a manager seeking to change the location of a user. In various examples, any other suitable tasks may be included in the drop down menu. For example, a user may register a time off request via the interactive user interface 200. In some examples, the user can change personal details (phone, home address), or travel expense reports can be submitted via the interactive user interface 200.

The interactive user interface 200 includes an utterance filtering setting 208. For example, the utterance filtering setting 208 may indicate the subset of conversation steps to be used for analysis. In the example of FIG. 2, all steps have been selected as being used for analysis. In some examples, a last utterance of each conversation may be selected as being used for analysis. In various examples, utterance filtering can also include first utterance or first significant utterance options. For example, a first significant utterance may be a first utterance in a conversation that is not irrelevant chit-chat, etc., as detected by a classifier.

The interactive user interface 200 includes a feature selection setting 210. For example, the feature selection setting 210 may include a list of feature types that can be used in the analysis. In various examples, the types of features included in the feature selection setting 210 may include user input, turn label, turn, intent, country, skill, among other feature types. In a manual feature selection mode, a user may select any number of features for analysis.

The interactive user interface 200 further includes an interaction mode selection 212. For example, the interaction mode selection 212 may enable users to select specific types of interactions across which features are to be analyzed. In the example of FIG. 2, the options in the interaction mode selection 212 include no interaction, in which each feature is separately checked without regard to any interactions between features. The options of the interaction mode selection 212 further include co-occurring features, in which the analysis may detect features that co-occur together. The options in the interaction mode selection 212 also include analyzing temporal sequences, in which features that co-occur in a specific sequences of turns or steps are also detected. In various examples, any other suitable types of interactions may be additionally included. In manual feature selection mode, a user may be able to select any number of the specific types of interactions for analysis.

The interactive user interface 200 includes a maximum number of feature values selection 214. For example, the maximum number of feature values selection 214 may enable a user to select a maximum number of features to be displayed in a list of final results of analysis. In the example of FIG. 2, the maximum number of feature values is set to five.

Figure 3:
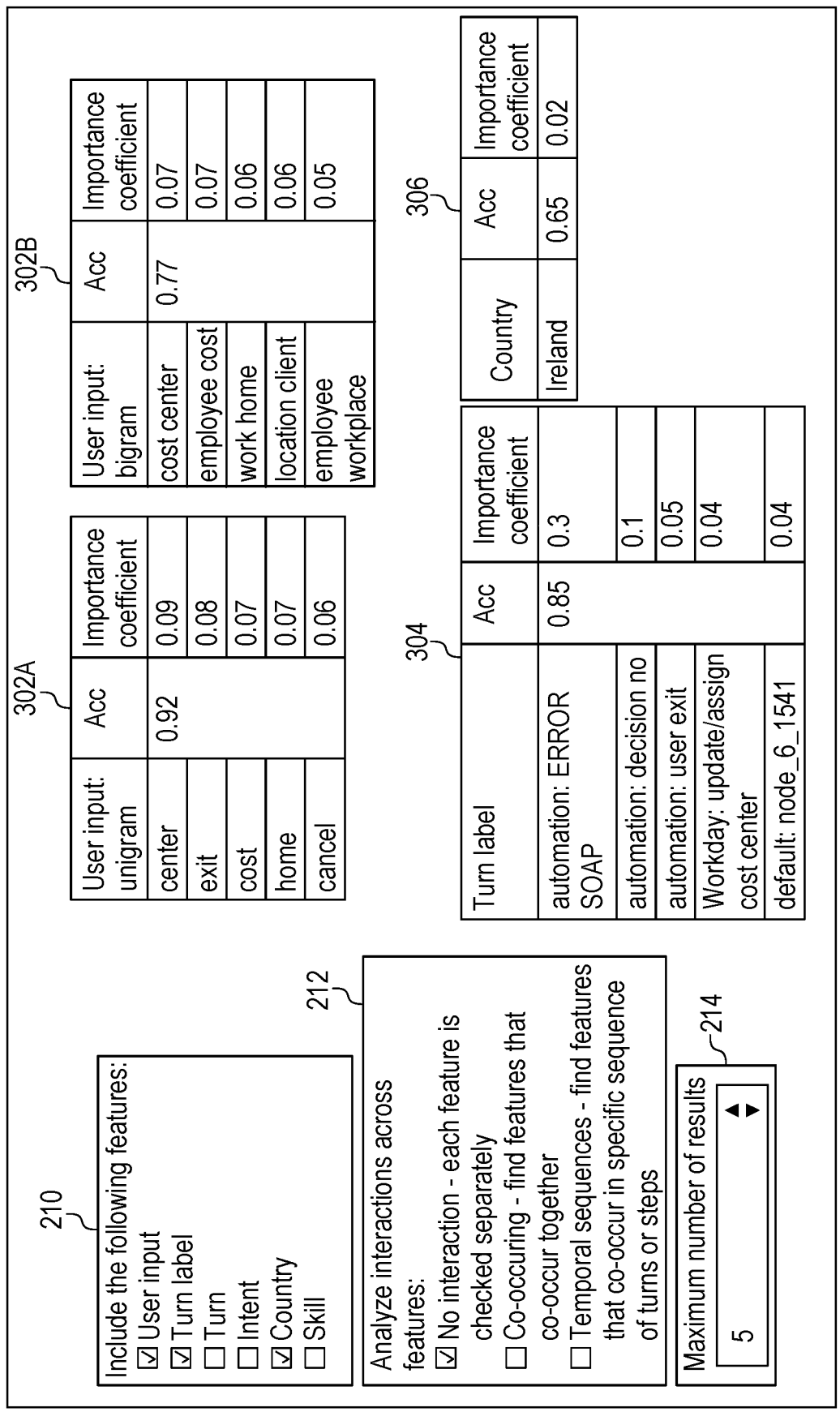
FIG. 3 is an example interactive user interface displaying extracted significant feature values.

FIG. 3 is an example interactive user interface displaying extracted significant feature values. The example interactive user interface 300 can be used by the process 100 of FIG. 1, or by the method 600 of FIG. 6. For example, the interactive user interface 300 can be generated by the processor 702 or the processor 1002 of FIGS. 7 and 10, respectively.

The interactive user interface 300 of FIG. 3 includes similarly referenced elements of FIG. 2. For example, the interactive user interface 300 includes a feature selection setting 210 with user input, turn label, and country selected. The interactive user interface 300 includes an interaction mode selection 212 with the no interaction option selected. Furthermore, the interactive user interface 300 includes a maximum number of results setting 214 with a number of five maximum results selected.

In the example interactive user interface 300, a total of four tables are output because three features have been selected for analysis and the user input feature was analyzed twice. The four tables include a unigram analyzed user input feature table 302A, a bigram analyzed user input feature table 302B, a turn label feature table 304, and a country feature table 306. The tables 302A, 302B, and 304 each have five most important feature values as set by the maximum number of results setting 214. By contrast, the table country feature table 306 only includes on feature value of "Ireland" because no other feature values exceeded a minimum importance threshold. In some examples, one of several mechanisms may have filtered out non-important features: including frequency threshold and statistical tests. In some examples, there may have simply not been enough feature values. For example, users may be from 3 countries overall in the system and the maximum number of feature values may have been set to 5.

Additionally, the tables 302A, 302B, 304, and 306 are ordered by accuracy of the underlying prediction model. For example, the accuracy of the prediction model used to generate the unigram analyzed user input feature table 302A has an accuracy of 0.92. Similarly, the prediction model used to generate the bigram analyzed user input feature table 302B has an accuracy of 0.77. The prediction model used to generate the turn label feature table 304 has an accuracy of 0.85. The prediction model used to generate the country feature table 306 has an accuracy of 0.65.

Figure 4:
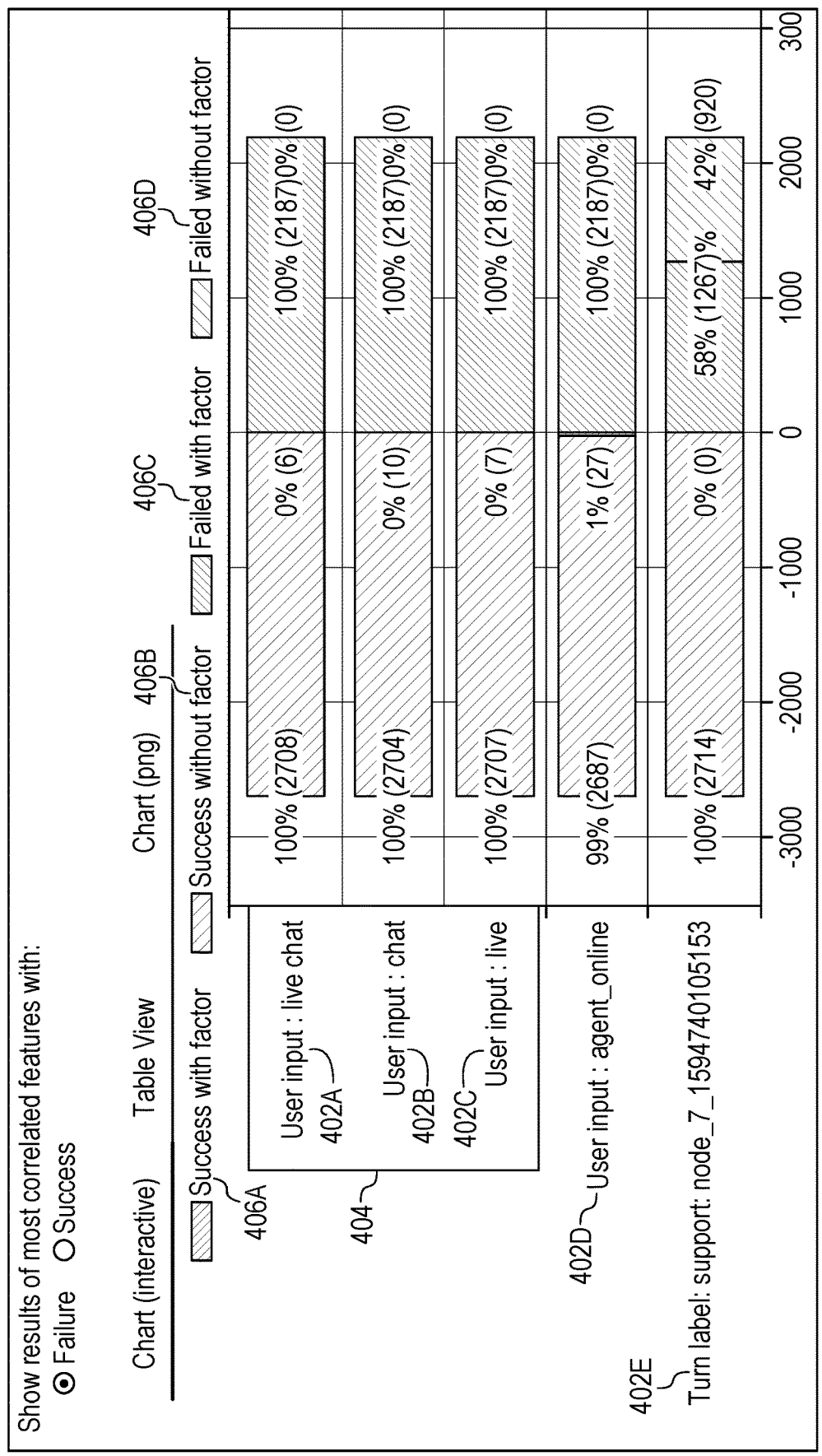
FIG. 4 is an example interactive user interface displaying significance charts.

FIG. 4 is an example interactive user interface displaying significance charts. The example interactive user interface 400 can be used by the process 100 of FIG. 1, or by the method 600 of FIG. 6. For example, the interactive user interface 400 can be generated by the processor 702 or the processor 1002 of FIGS. 7 and 10, respectively.

The example interactive user interface 400 includes a set of significance charts. In particular, the interactive user interface 400 includes a visual representation including centrally aligned stacked horizontal bar charts. The vertical axis contains the prioritized list of feature values. In particular, the significance charts of the example of FIG. 4 include a user input: live chat significance chart 402A, a user input: chat significance chart 402B, a user input: live significance chart 402C, a user input: agent_online significance chart 402D, and a turn label: support: node_7_1594740105153 significance chart 402E. For example, the live chat significance chart 402A shows data points corresponding to the bigram "live chat." The user input: chat significance chart 402B shows data points corresponding to the unigram "chat". Similarly, the user input: live significance chart 402C shows data points corresponding to the unigram "live". The user input: agent_online significance chart 402D shows data points corresponding to the unigram "agent_online". The turn label: support: node_7_1594740105153 significance chart 402E significance chart shows data points corresponding to the particular node corresponding to a turn in conversation. Three of the significance charts, including the user input: live chat significance chart 402A, the user input: chat significance chart 402B, and the user input: live significance chart 402C have been selected to be included in a blacklist. Thus, these feature values may be ignored for purposes of escalation analysis to enable other more useful feature values to be displayed.

In the example of FIG. 4, four data points are presented for each bar chart. The four data points include success without factor 406A indicating the number of successes without of a particular feature value in the dataset, success with factor 406B indicating the number of success with this feature value, failed with factor 406C indicating the number of failed conversations with this value, and failed without factor 406D indicating the number of failed conversations in dataset that did not include the feature value. For example, out of a total of 2714 successful conversations, 6 conversations included the bigram "live chat" and 2708 did not include the bigram. By contrast, all of the 2187 failed conversations included the bigram "live chat." In some examples, although shown as divergent shading in FIG. 4, red and green divergent colors, or any other sets of divergent colors, may be used to represent failures and successes, respectively. The use of such divergent coloring may enable conversation analysts to more clearly see feature values that are more associated with failures versus successes.

In the particular example of FIG. 4, the user input: live chat significance chart 402A, the user input: chat significance chart 402B, and the user input: live significance chart 402C each indicate 0% without the feature value and 100% success with the feature value. The user input: agent_online significance chart 402D indicates a 1% success with the feature value and the turn label: support: node_7_1594740105153 significance chart 402E significance chart indicates a 58% failure with the feature value.

In various examples, blacklisting can be performed for each single analysis or saved in client preferences for future analyses. For example, in FIG. 4, the user input: live chat significance chart 402A, the user input: chat significance chart 402B, and the user input: live significance chart 402C have been selected to be included in a blacklist because each of these feature values may not provide useful information to a conversation analyst. For example, "live chat" may be a phrase provided during escalation and thus not surprisingly always associated with a failure of conversation and very rarely with successful conversations. Therefore, such feature values may be blacklisted to provide spots in the top 5 most significant feature values for more useful feature values.

Figure 5:
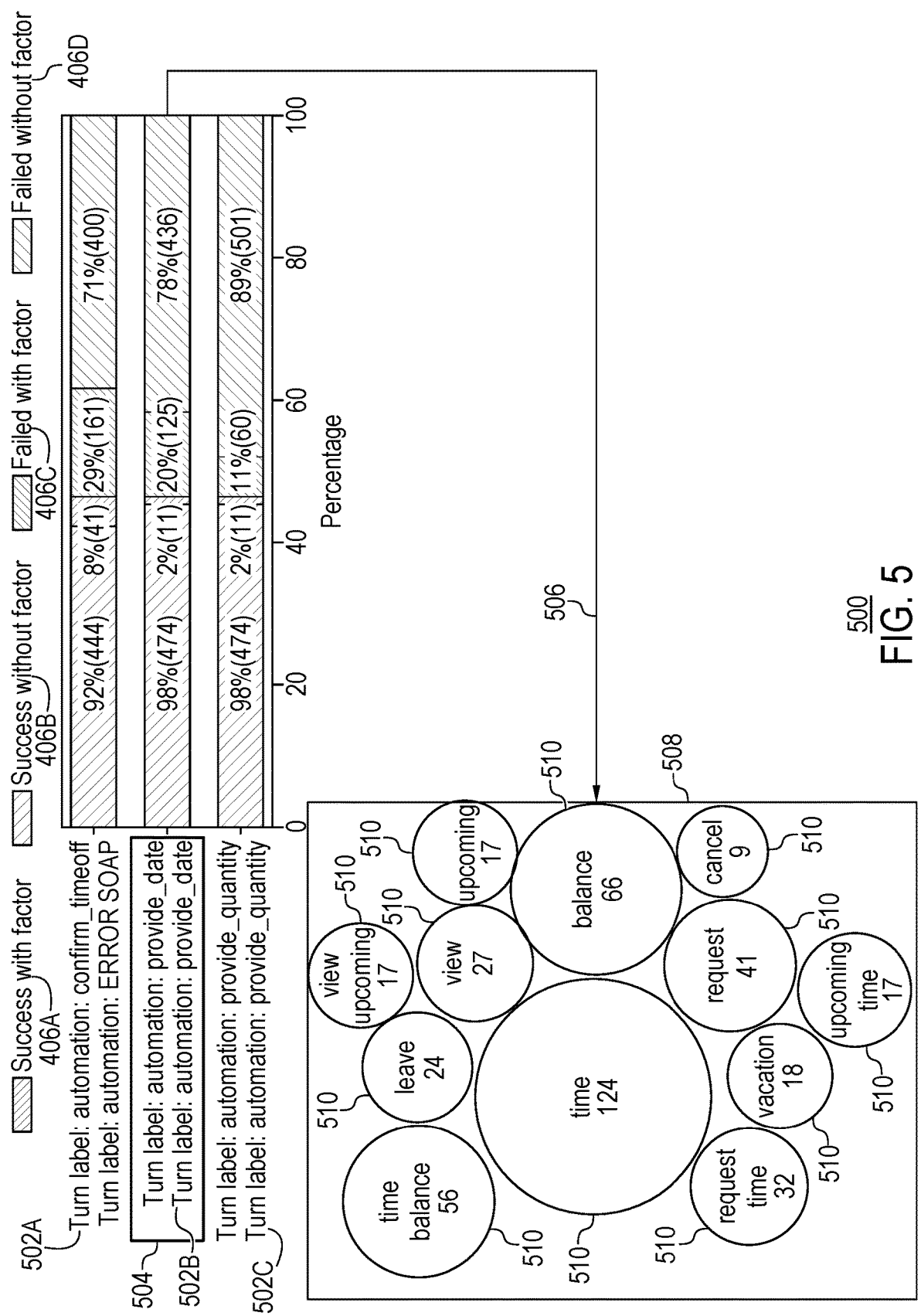
FIG. 5 is an example interactive user interface displaying frequent n-grams in conversations associated with selected feature values.

FIG. 5 is an example interactive user interface displaying frequent n-grams in conversations associated with selected feature values. The example interactive user interface 500 can be used by the process 100 of FIG. 1, or by the method 600 of FIG. 6. For example, the interactive user interface 500 can be generated by the processor 702 or the processor 1002 of FIGS. 7 and 10, respectively.

FIG. 5 includes similarly numbered elements from FIG. 4. In the example of FIG. 5, the provided significance charts 502A, 502B, and 502C represent the presence of temporal interactions between pairs of feature values in conversation successes and failures. In particular, the feature values shown are various turn labels, which are names of nodes handling particular stages of conversation. The turn label: automation:confirm_timeoff/turn label:automation:ERROR_SOAP significance chart 502A indicates successes and failures associated with a change in the node handling the conversation from the turn label:automation:confirm_timeoff node to the turn label:automation:ERROR_SOAP node. The significance chart 502B indicates successes and failures associated with being stuck at a provide_date node. Similarly, the significance chart 502C indicates successes and failures associated with being stuck at a provide_quantity node.

In the example of FIG. 5, a representation of most frequent n-grams 508 is shown including various n-gram values 510 represented by circles with sizes corresponding to frequency of the particular n-gram values. In this manner, the interactive user interface 500 may enable conversation traceability and allow deeper inspection of root causes of failures. In various examples, for each significant feature value or interaction, a user can view transcripts of the corresponding conversations or most frequent n-grams in these conversations. In the example of FIG. 5, the selection 504 of significance chart 502B has generated a most frequent n-gram chart 508 for the turn label:automation:provide_date/turn label:automation:provide_date temporal interaction. For example, the selection 504 may be performed in response to detecting a mouse click event, a hover over event, or any other suitable gesture event at the significance chart 502B. From the generated most frequent n-gram chart 510 of FIG. 5, a conversation analyst can determine that many questions related to the unigrams "time" and "balance" are observed for conversations stuck at the provide_date node.

Figure 6:
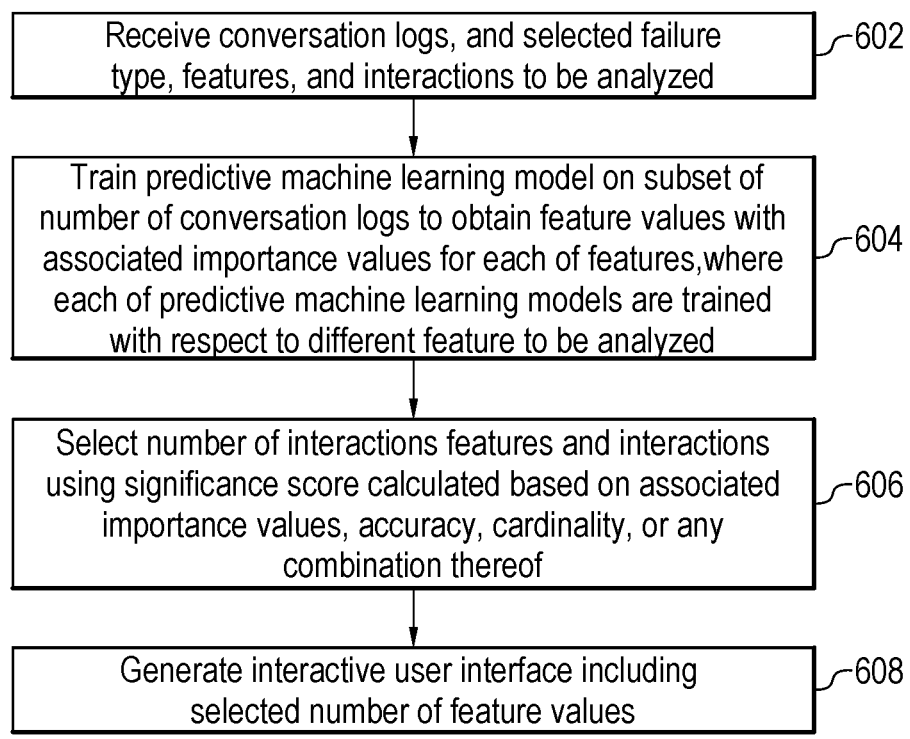
FIG. 6 is a process flow diagram of an example method that can extract and interactively displaying features of dialogue systems.

FIG. 6 is a process flow diagram of an example method that can extract and interactively display selected feature values of dialogue systems. The method 600 can be implemented with any suitable computing device, such as the computing device 300 of FIG. 3. For example, the method described below can be implemented by the processor 702 or the processor 1002 of FIGS. 7 and 10, respectively.

At block 602, a processor receives a number of conversation logs, and selected features and interaction types to be analyzed. The processor may also receive selected failure types. In some examples, the processor can receive a blacklist of feature values not to analyze.

At block 604, the processor trains a predictive machine learning model on a subset of the number of conversation logs to obtain feature values with associated importance values for the feature. Each of the predictive machine learning models may be trained with respect to a different feature to be analyzed. In this manner, the processor can obtains, via the training of the predictive machine learning models feature values with associated importance values from the conversation logs for every feature and interaction between pairs of the features. In some examples, the processor can apply frequency filtering on the feature values prior to executing the prediction model. In various examples, the processor can extract feature values corresponding to interactions between two features. In various examples, the processor can execute the prediction models without the subset of the feature values to generate a set of feature values with associated importance values that does not include the blacklisted feature values.

At block 606, the processor selects a number of feature values using a significance score calculated based on the associated importance values. In various examples, the processor can calculate the significance score based on the associated importance values, cardinality of the feature values, or accuracy of the associated prediction model. For example, the significance score may be calculated based on Eq. 1 above.

At block 608, the processor generates an interactive user interface including the selected number of feature values. In some examples, the processor can generate a conversations transcript including relevant portions of a conversation logs in response to detecting a selection of a significance bar chart in the interactive user interface. In various examples, the processor can generate a most significant n-gram chart in response to detecting a selection of a significance bar chart in the interactive user interface.

The process flow diagram of FIG. 6 is not intended to indicate that the operations of the method 600 are to be executed in any particular order, or that all of the operations of the method 600 are to be included in every case. Additionally, the method 600 can include any suitable number of additional operations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
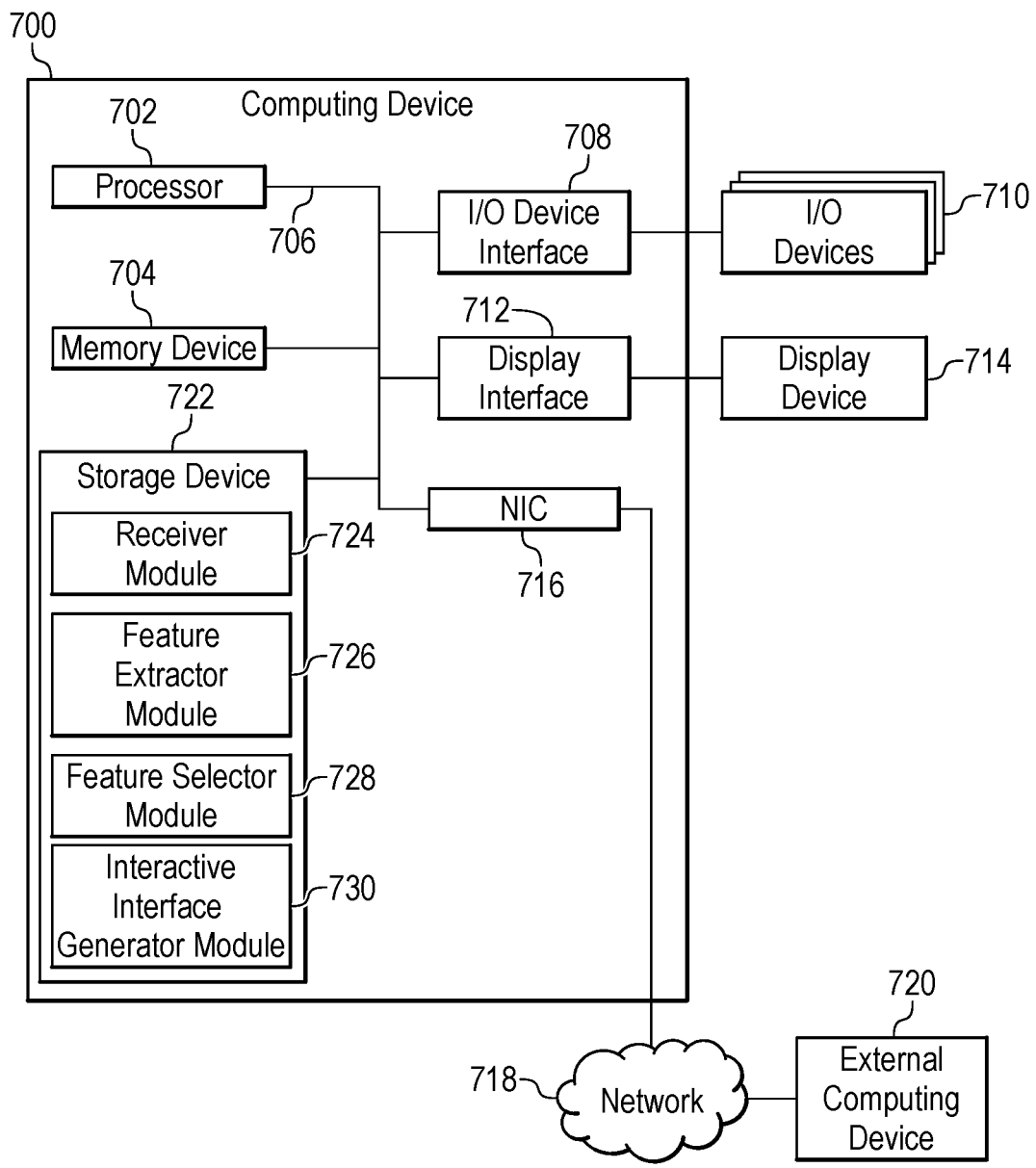
FIG. 7 is a block diagram of an example computing device that can detect and interactively displaying features of dialogue systems.

FIG. 7 is block diagram of an example computing device that can extract and interactively display selected feature values of dialogue systems. The computing device 700 may be for example, a server, desktop computer, laptop computer, tablet computer, or smartphone. In some examples, computing device 700 may be a cloud computing node. Computing device 700 may be described in the general context of computer system executable instructions, such as program modules, being executed by a computer system. Generally, program modules may include routines, programs, objects, components, logic, data structures, and so on that perform particular tasks or implement particular abstract data types. Computing device 700 may be practiced in distributed cloud computing environments where tasks are performed by remote processing devices that are linked through a communications network. In a distributed cloud computing environment, program modules may be located in both local and remote computer system storage media including memory storage devices.

The computing device 700 may include a processor 702 that is to execute stored instructions, a memory device 704 to provide temporary memory space for operations of said instructions during operation. The processor can be a single-core processor, multi-core processor, computing cluster, or any number of other configurations. The memory 704 can include random access memory (RAM), read only memory, flash memory, or any other suitable memory systems.

The processor 702 may be connected through a system interconnect 706 (e.g., PCI®, PCI-Express®, etc.) to an input/output (I/O) device interface 708 adapted to connect the computing device 700 to one or more I/O devices 710. The I/O devices 710 may include, for example, a keyboard and a pointing device, wherein the pointing device may include a touchpad or a touchscreen, among others. The I/O devices 710 may be built-in components of the computing device 700, or may be devices that are externally connected to the computing device 700.

The processor 702 may also be linked through the system interconnect 706 to a display interface 712 adapted to connect the computing device 700 to a display device 714. The display device 714 may include a display screen that is a built-in component of the computing device 700. The display device 714 may also include a computer monitor, television, or projector, among others, that is externally connected to the computing device 700. In addition, a network interface controller (NIC) 716 may be adapted to connect the computing device 700 through the system interconnect 706 to the network 718. In some embodiments, the NIC 716 can transmit data using any suitable interface or protocol, such as the internet small computer system interface, among others. The network 718 may be a cellular network, a radio network, a wide area network (WAN), a local area network (LAN), or the Internet, among others. An external computing device 720 may connect to the computing device 700 through the network 718. In some examples, external computing device 720 may be an external webserver 720. In some examples, external computing device 720 may be a cloud computing node.

The processor 702 may also be linked through the system interconnect 706 to a storage device 722 that can include a hard drive, an optical drive, a USB flash drive, an array of drives, or any combinations thereof. In some examples, the storage device may include a receiver module 724, a feature extractor module 726, a feature selector module 728, and an interactive interface generator module 730. The receiver module 724 can receive conversation logs of a dialogue system to be analyzed. The receiver module 724 can receive a feature and an interaction type to be analyzed. The receiver module 724 can also receive a selected failure type to be analyzed. In various examples, the receiver module 724 can receive a root cause analysis setting including a selected failure type, a selected flow, a selected subset of conversation steps, a selected feature, and a selected interaction type. The feature extractor module 726 can train a predictive machine learning model using a training set of the conversation logs on a selected feature to obtain feature values with associated importance values. In some examples, the feature extractor module 726 can train a predictive model on an interaction between two selected features, and obtain pairs of feature values for the interaction and an importance value associated with the interaction, wherein the selected number of feature values includes a feature value for the interaction. In some examples, the feature extractor module 726 can apply frequency filtering or statistical significance filtering on the feature values. For example, the frequency filtering or statistical significance filtering may be applied prior to executing the prediction model or after executing the prediction model. In various examples, a predetermined number of top n feature values as determined by importance values from each predictive machine learning model may be sent to the feature selector module 728. The feature selector module 728 can select a number of the feature values using a significance score calculated based on the associated importance values. In some examples, the calculated significance score is further calculated based on accuracy of the corresponding prediction model. For example, the accuracy of the corresponding prediction model may be calculated by inputting a subset of the conversation logs not used for the training into the trained prediction models. In various examples, the calculated significance score is further calculated based on a cardinality of the feature values. The interactive interface generator module 730 can generate an interactive user interface including the selected number of feature values. In some examples, the interactive interface generator module 730 can display a root cause analysis setting user interface. In various examples, the interactive interface generator module 730 can generate a conversations transcript including relevant portions of a conversation logs in response to detecting a selection of a significance bar chart in the interactive user interface. In some examples, the interactive interface generator module 730 can generate a most significant n-gram chart in response to detecting a selection of a significance bar chart in the interactive user interface.

It is to be understood that the block diagram of FIG. 7 is not intended to indicate that the computing device 700 is to include all of the components shown in FIG. 7. Rather, the computing device 700 can include fewer or additional components not illustrated in FIG. 7 (e.g., additional memory components, embedded controllers, modules, additional network interfaces, etc.). Furthermore, any of the functionalities of the receiver module 724, the feature extractor module 726, the feature selector module 728, and the interactive interface generator module 730 may be partially, or entirely, implemented in hardware and/or in the processor 702. For example, the functionality may be implemented with an application specific integrated circuit, logic implemented in an embedded controller, or in logic implemented in the processor 702, among others. In some embodiments, the functionalities of the feature extractor module 726, the feature selector module 728, and the interactive interface generator module 730 can be implemented with logic, wherein the logic, as referred to herein, can include any suitable hardware (e.g., a processor, among others), software (e.g., an application, among others), firmware, or any suitable combination of hardware, software, and firmware.

Figure 8:
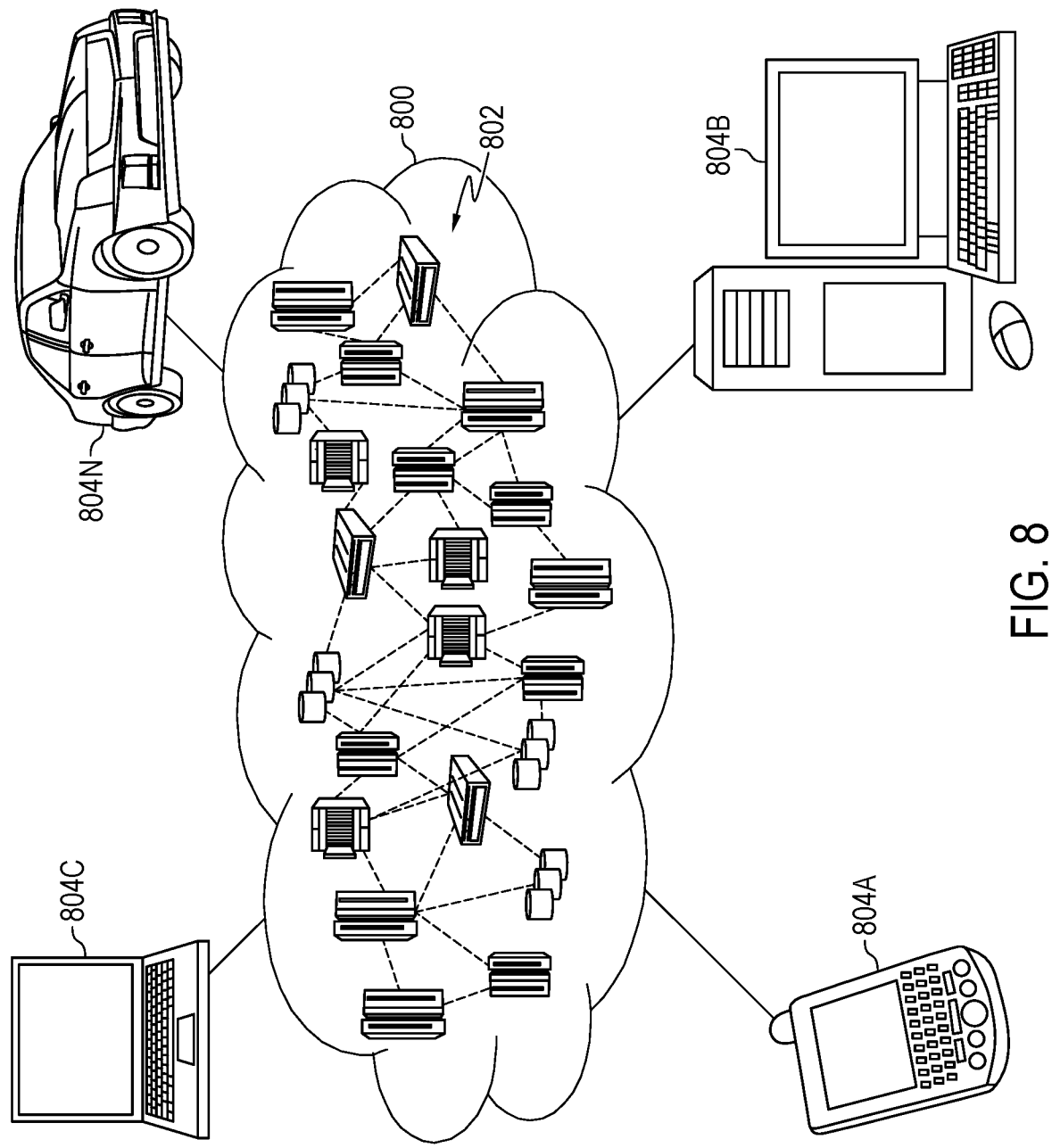
FIG. 8 is a diagram of an example cloud computing environment according to embodiments described herein.

Referring now to FIG. 8, illustrative cloud computing environment 800 is depicted. As shown, cloud computing environment 800 includes one or more cloud computing nodes 802 with which local computing devices used by cloud consumers, such as, for example, personal digital assistant (PDA) or cellular telephone 804A, desktop computer 804B, laptop computer 804C, and/or automobile computer system 804N may communicate. Nodes 802 may communicate with one another. They may be grouped (not shown) physically or virtually, in one or more networks, such as Private, Community, Public, or Hybrid clouds as described hereinabove, or a combination thereof. This allows cloud computing environment 800 to offer infrastructure, platforms and/or software as services for which a cloud consumer does not need to maintain resources on a local computing device. It is understood that the types of computing devices 804A-N shown in FIG. 8 are intended to be illustrative only and that computing nodes 802 and cloud computing environment 800 can communicate with any type of computerized device over any type of network and/or network addressable connection (e.g., using a web browser).

Figure 9:
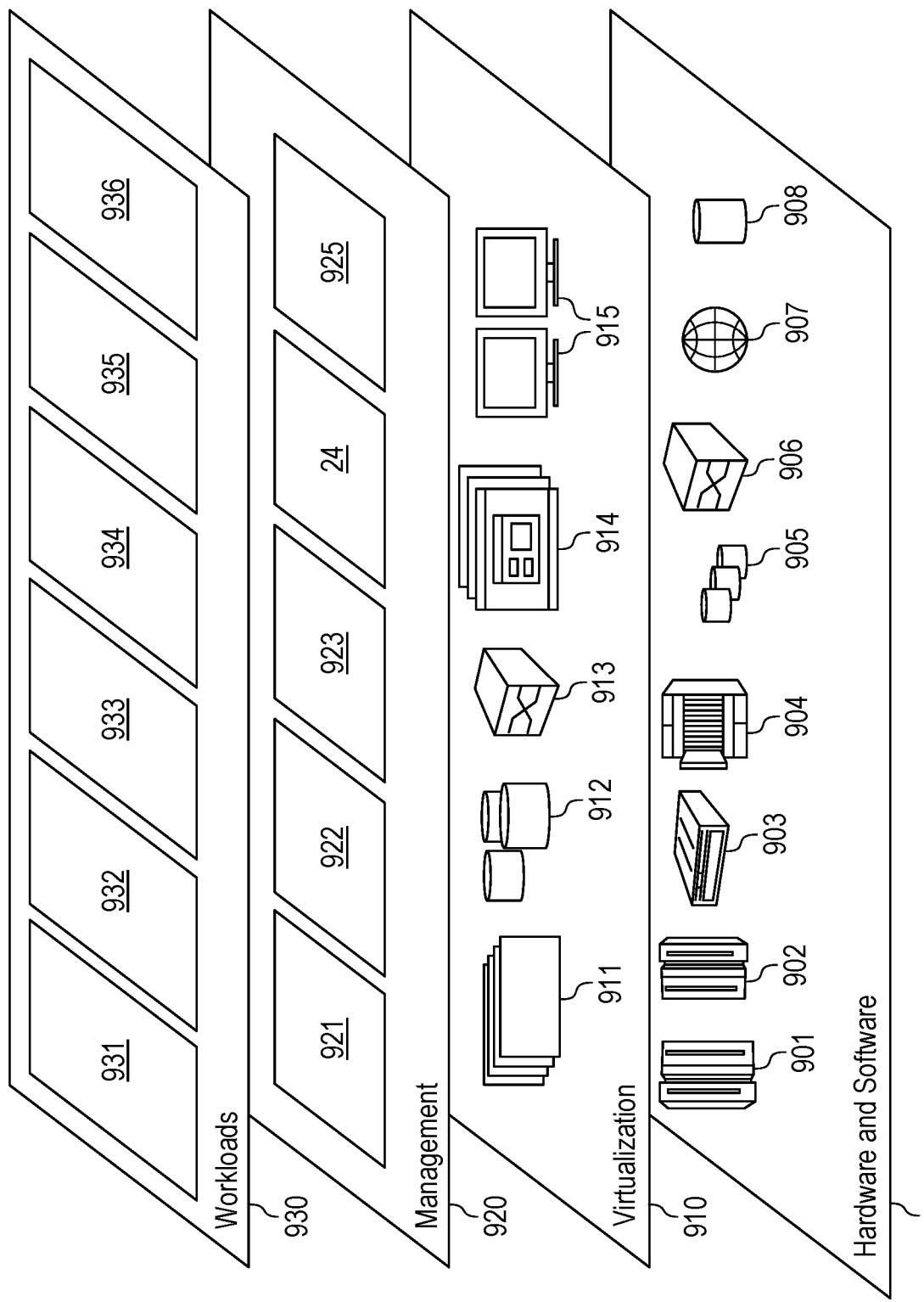
FIG. 9 is a diagram of an example abstraction model layers according to embodiments described herein.

Referring now to FIG. 9, a set of functional abstraction layers provided by cloud computing environment 800 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 900 includes hardware and software components. Examples of hardware components include: mainframes 901; RISC (Reduced Instruction Set Computer) architecture based servers 902; servers 903; blade servers 904; storage devices 905; and networks and networking components 906. In some embodiments, software components include network application server software 907 and database software 908.

Virtualization layer 910 provides an abstraction layer from which the following examples of virtual entities may be provided: virtual servers 911; virtual storage 912; virtual networks 913, including virtual private networks; virtual applications and operating systems 914; and virtual clients 915.

In one example, management layer 920 may provide the functions described below. Resource provisioning 921 provides dynamic procurement of computing resources and other resources that are utilized to perform tasks within the cloud computing environment. Metering and Pricing 922 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 923 provides access to the cloud computing environment for consumers and system administrators. Service level management 924 provides cloud computing resource allocation and management such that required service levels are met. Service Level Agreement (SLA) planning and fulfillment 925 provide pre-arrangement for, and procurement of, cloud computing resources for which a future requirement is anticipated in accordance with an SLA.

Workloads layer 930 provides examples of functionality for which the cloud computing environment may be utilized. Examples of workloads and functions which may be provided from this layer include: mapping and navigation 931; software development and lifecycle management 932; virtual classroom education delivery 933; data analytics processing 934; transaction processing 935; and failure root cause identification and assessment 936.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 10:
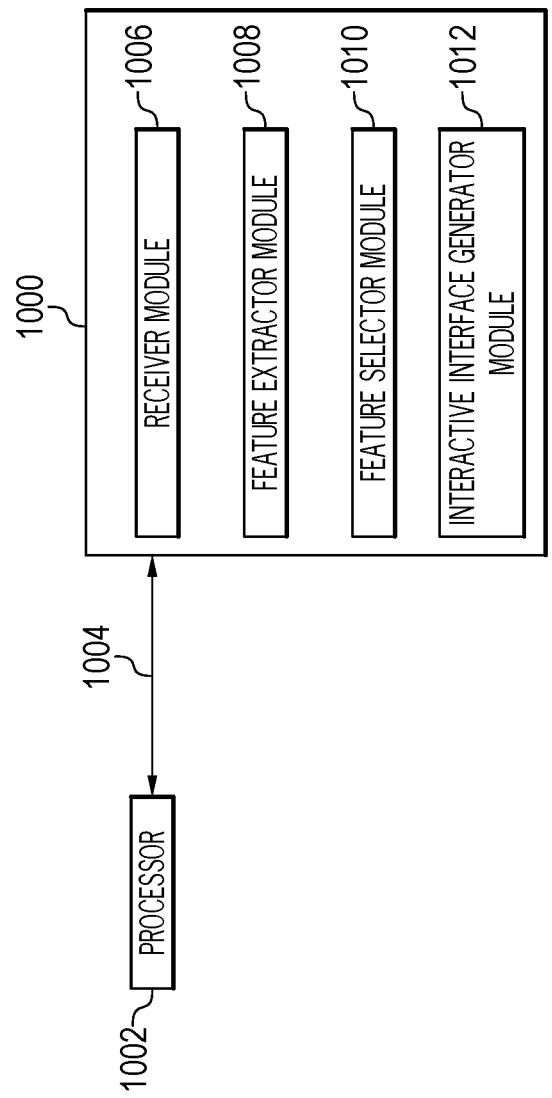
FIG. 10 is an example tangible, non-transitory computer-readable medium that can detect and interactively displaying features of dialogue systems.

Referring now to FIG. 10, a block diagram is depicted of an example tangible, non-transitory computer-readable medium 1000 that can extract and interactively display selected feature values of dialogue systems. The tangible, non-transitory, computer-readable medium 1000 may be accessed by a processor 1002 over a computer interconnect 1004. Furthermore, the tangible, non-transitory, computer-readable medium 1000 may include code to direct the processor 1002 to perform the operations of the method 600 of FIG. 6.

The various software components discussed herein may be stored on the tangible, non-transitory, computer-readable medium 1000, as indicated in FIG. 10. For example, a receiver module 1006 includes code to receive conversation logs, a selected feature, and an interaction type, to be analyzed. In some examples, the receiver module 1006 includes code to receive number of selected features. The receiver module 1006 also includes code to receive a selected failure type to be analyzed. In some examples, the receiver module 1006 includes code to receive a blacklist of feature values to be not analyzed. A feature extractor module 1008 includes code to train a predictive machine learning model on a subset of the number of conversation logs for the selected feature to obtain feature values with associated importance values. In some examples, the feature extractor module 1008 can train a number of predictive machine learning models to obtain feature values with associated importance values for each of the number of selected features. In some examples, the feature extractor module 1008 can train a predictive machine learning model to obtain pairs of feature values with associated importance values for the selected interaction between two of the selected features. For example, the output of the training may be pairs of feature values with each pair having an associated importance score indicating the importance of the interaction between the pair. In various examples, the feature extractor module 1008 can extract a predetermined number of top n feature values from each of the predictive machine learning models as determined by importance values. A feature selector module 1010 includes code to select a number of the feature values using a significance score calculated based on the associated importance values. The feature selector module 1010 also includes code to calculate the significance score based on accuracy of the corresponding prediction model. The feature selector module 1010 also further includes code to calculate the significance score based on a cardinality of the feature values. An interactive interface generator 1012 includes code to generate an interactive user interface including the selected number of feature values. In some examples, the interactive interface generator 1012 includes code to generate a conversations transcript including relevant portions of a conversation logs in response to detecting a selection of a significance bar chart in the interactive user interface. In various examples, the interactive interface generator 1012 includes code to generate a most significant n-gram chart in response to detecting a selection of a significance bar chart in the interactive user interface.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 10 may be included within the tangible, non-transitory, computer-readable medium 1000, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
   receive conversation logs of a dialogue system to be analyzed;
   train a predictive machine learning model using a training set of the conversation logs on a selected feature to obtain feature values with associated importance values;
   select a plurality of the feature values using a significance score calculated based on the associated importance values; and
   generate an interactive user interface comprising the selected plurality of feature values.

2. The system of claim 1, wherein the processor is to train a predictive model on an interaction between two selected features, and obtain pairs of feature values for the interaction and an importance value associated with the interaction, wherein the selected plurality of feature values comprises a feature value for the interaction.

3. The system of claim 1, wherein the processor is to display a root cause analysis setting user interface and receive a root cause analysis setting comprising a selected failure type, a selected flow, a selected subset of conversation steps, a selected feature, and a selected interaction type.

4. The system of claim 1, wherein the processor is to apply frequency filtering on the feature values.

5. The system of claim 1, wherein the calculated significance score is further calculated based on accuracy of a corresponding prediction model, wherein the accuracy of the corresponding prediction model is calculated by inputting a subset of the conversation logs not used for the training into the trained prediction model.

6. The system of claim 1, wherein the calculated significance score is further calculated based on a cardinality of the feature values.

7. The system of claim 1, wherein the processor is to apply statistical significance filtering on the feature values.

8. A computer-implemented method, comprising:
   receiving, via a processor, a plurality of conversation logs, a feature and an interaction type to be analyzed;
   training, via the processor, a predictive machine learning model on a subset of the plurality of conversation logs to obtain feature values with associated importance values for the feature, wherein the predictive machine learning model is trained with respect to a different feature to be analyzed;
   selecting, via the processor, a plurality of feature values using a significance score calculated based on the associated importance values; and
   generating, via the processor, an interactive user interface comprising the selected plurality of feature values.

9. The computer-implemented method of claim 8, further comprising receiving a selected failure type to be analyzed.

10. The computer-implemented method of claim 8, further comprising training a predictive machine learning model to obtain feature values with associated importance values for an interaction between two features based on the interaction type.

11. The computer-implemented method of claim 8, comprising extracting feature values corresponding to interactions between two features.

12. The computer-implemented method of claim 8, comprising generating a conversations transcript comprising relevant portions of conversation logs in response to detecting a selection of a significance bar chart in the interactive user interface.

13. The computer-implemented method of claim 8, comprising generating a most significant n-gram chart in response to detecting a selection of a significance bar chart in the interactive user interface.

14. The computer-implemented method of claim 8, further comprising receiving a blacklist comprising a subset of the feature values and executing the predictive machine learning model without the subset of the feature values to generate a second set of feature values with associated importance values.

15. A computer program product for generating interactive user interfaces, the computer program product comprising a computer-readable storage medium having program code embodied therewith, the program code executable by a processor to cause the processor to:
receive conversation logs, a selected feature, and an interaction type, to be analyzed;
train a predictive machine learning model on a subset of the conversation logs for the selected feature to obtain feature values with associated importance values;
select a plurality of the feature values using a significance score calculated based on the associated importance values; and
generate an interactive user interface comprising the selected plurality of feature values.

16. The computer program product of claim 15, further comprising program code executable by the processor to receive a plurality of selected features and train a plurality of predictive machine learning models to obtain feature values with associated importance values for each of the plurality of selected features, wherein the selected plurality of feature values comprise feature values associated with different features.

17. The computer program product of claim 15, further comprising program code executable by the processor to receive a plurality of selected features and a selected interaction between the plurality of selected features and train a predictive machine learning model to obtain pairs of feature values with associated importance values for the selected interaction between two of the selected features.

18. The computer program product of claim 15, further comprising program code executable by the processor to calculate the significance score based on an accuracy of a corresponding prediction model and a cardinality of the feature values.

19. The computer program product of claim 15, further comprising program code executable by the processor to generate a conversations transcript comprising relevant portions of conversation logs in response to detecting a selection of a significance bar chart in the interactive user interface.

20. The computer program product of claim 15, further comprising program code executable by the processor to generate a most significant n-gram chart in response to detecting a selection of a significance bar chart in the interactive user interface.

* * * * *